United States Patent
Shibata

(10) Patent No.: US 6,570,939 B1
(45) Date of Patent: May 27, 2003

(54) RECEIVING DEVICE WITH DEMODULATING FUNCTION BASED ON ORTHOGONAL DETECTION AND EQUALIZING FUNCTION BASED ON MAXIMUM LIKELIHOOD SEQUENCE ESTIMATION

(75) Inventor: Takayuki Shibata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/371,723

(22) Filed: Aug. 10, 1999

(30) Foreign Application Priority Data

Aug. 11, 1998 (JP) .............................. 10-227115

(51) Int. Cl.$^7$ .............................. H03D 1/00; H04L 27/06
(52) U.S. Cl. ...................................... 375/341; 375/235
(58) Field of Search .............................. 375/341, 229, 375/235, 340, 350; 708/323

(56) References Cited

U.S. PATENT DOCUMENTS

| | | | | |
|---|---|---|---|---|
| 5,914,990 A | * | 6/1999 | Soderkvist | 375/350 |
| 5,920,595 A | * | 7/1999 | Iwamatsu | 375/235 |
| 5,974,306 A | * | 10/1999 | Hornak et al. | 455/323 |
| 6,034,564 A | * | 3/2000 | Iwamatsu | 329/306 |
| 6,278,732 B1 | * | 8/2001 | Beidas et al. | 375/235 |

FOREIGN PATENT DOCUMENTS

JP  1-300611  12/1989

OTHER PUBLICATIONS

Horikoshi, et al., "Waveform Equalization Technology For Digital Mobile Communication", *Triceps Publication*, pp. 85–89.

* cited by examiner

Primary Examiner—Phuong Phu
(74) Attorney, Agent, or Firm—Dickstein, Shapiro, Morin & Oshinsky, LLP.

(57) ABSTRACT

In a receiving device, a mixer combines a frequency which is different from a carrier frequency by $(2n+½)\omega0$ and a reception signal, provided that n is an integer, $\omega0=2\Pi/T$, and T is a transmission rate of a base band signal, a filter takes out a base band signal of a center frequency of $(2n+½)\omega0$ and removes a DC component, so as to sample the signal and put it through A/D conversion, a multiplier combines the signal and a polarity signal, so as to obtain an in-phase component p(nT) of the reception signal at time nT and an orthogonal component q[(n+½)T] of the reception signal at time (n+½)T. A branch metric is calculated and maximum likelihood sequence estimation is executed on the basis of those components and a replica signals pR(nT) and qR[(n+½)T], so as to estimate a signal sequence. Thus the receiving device exhibits improved performance as it is capable of eliminating any phase difference and amplitude difference between Ich and Qch and any DC offset, without requiring any large-scale additional circuit.

3 Claims, 3 Drawing Sheets

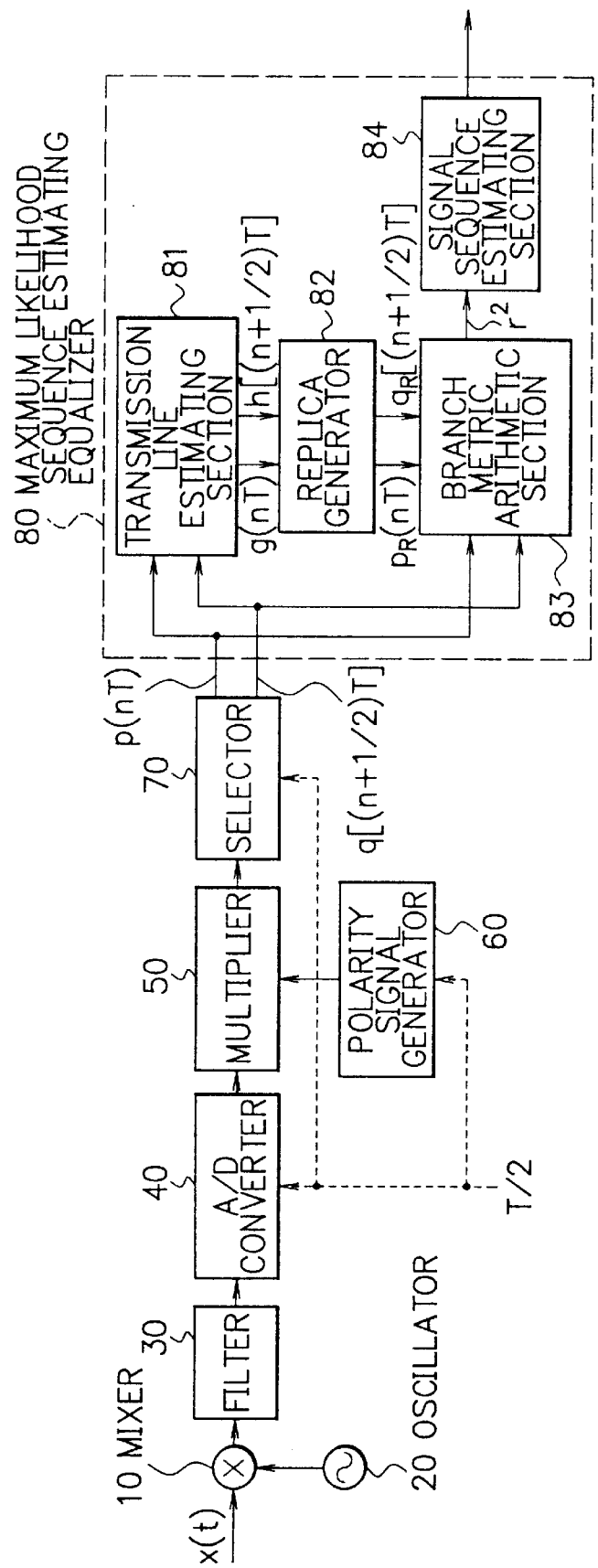

RECEIVING DEVICE WITH DEMODULATING FUNCTION BASED ON ORTHOGONAL DETECTION AND EQUALIZING FUNCTION BASED ON MAXIMUM LIKELIHOOD SEQUENCE ESTIMATION

BACKGROUND OF THE INVENTION

The present invention relates to a receiving device applied in a digital radio communication system, and in particular to a receiving device having a demodulating function based on orthogonal detection, and an equalizing function based on maximum likelihood sequence estimation.

DESCRIPTION OF THE RELATED ART

FIG. 1 is a block diagram showing an example of constitution of a conventional radio device. As it is shown in the figure, in general, the receiving device comprises an orthogonal detector 110, A/D converters 120, 130, a maximum likelihood sequence estimating equalizer 150, and an oscillator 140. The orthogonal detector 110 is where a signal having gone through an orthogonal demodulation is inputted and two base band signal components orthogonal to each other are generated to be outputted to the A/D converters. The A/D converters 120 and 130 serve to convert each base band signal component inputted from the orthogonal detector 110 to a digital signal, at every sampling period, so as to output the digital signal to the maximum likelihood sequence estimating equalizer 150. The maximum likelihood sequence estimating equalizer 150 is to output an estimation signal on the basis of the digital signals inputted from the A/D converters 120 and 130. The oscillator 140 serves to oscillate and output a signal which is to be combined with the signal inputted to the orthogonal detector 110.

The orthogonal detector 110 includes a mixer 111 for combining the signal having gone through an orthogonal modulation together with the signal outputted from the oscillator 140, a Π/2 phase shifter 115 for shifting a phase of the signal from the oscillator 140 by Π/2, a mixer 112 inputting a phase-shifted signal from the Π/2 phase shifter 115 where the phase shifted signal is combined with the orthogonal-modulated signal, a filter 113 for letting only predetermined frequency component in the resultant signal from the mixer 111 pass through, so as to output an in-phase component in the base band signal, and a filter 114 for letting only the predetermined component in the resultant signal from the mixer 112 pass through, so as to output an orthogonal component in the base band signal.

The maximum likelihood sequence estimating equalizer 150 has a transmission line estimating section 151, a replica generator 152, a branch metric arithmetic section 153, and a signal sequence estimating section 154. The transmission line estimating section 151 is to calculate the in-phase component in an impulse response of a transmission line on the basis of the output from the filter 113 having been modulated to a digital signal at the A/D converter 120. The transmission line estimating section 151 also serves to calculate the orthogonal component in the impulse response of the transmission line on the basis of the output from the filter 114 having been modulated to a digital signal at the A/D converter 130. The replica generator 152 generates a replica on the basis of the in-phase component and the orthogonal component in the impulse response of the transmission line, that are being calculated at the transmission line estimating section 151. The branch metric arithmetic section 153 is to calculate a branch metric on the basis of the digitally modulated signals from the A/D converters 120 and 130 having been outputted from the filters 113 and 114, respectively, and the replica generated at the replica generator 152. The signal sequence estimating section 154 is to estimate the transmitted signal sequence in accordance with the branch metric calculated at the branch metric arithmetic section 153. In this case, the replica is a product of a convolution of a candidate signal sequence and the transmission line impulse response, which indicates an estimated value of a reception signal in case when a candidate signal is being transmitted.

In the following, operation of the conventional receiving device as constructed above will be described.

When a signal $x(t)=p(t) \cos \omega ct - q(t) \sin \omega ct$ is inputted to the orthogonal detector 110, where $\omega c$ is a carrier wave of angular frequency, the input signal $x(t)$ and the $\cos \omega ct$ signal outputted from the oscillator 140 are combined at the mixer 111, which product passes through the filter 113, providing the in-phase component $p(t)$ of the base band signal.

Furthermore, a phase of the signal $\cos \omega ct$ outputted from the oscillator 140 is shifted by $\Pi/2$ resulting in giving out a signal $-\sin \omega ct$ to the $\Pi/2$ phase shifter 115. Then at the mixer 112, the input signal $x(t)$ and the signal $-\sin \omega ct$ are combined, which product passes through the filter 114, providing the orthogonal component $q(t)$ of the base band signal.

The in-phase component $p(t)$ of the base band signal outputted from the orthogonal detector 110 is converted into a digital signal at the A/D converter 120, at every sampling period T, providing a digital reception signal $p(nT)$. Here, 'T' is a transmission rate of the base band signal, and 'n' is an integer.

The orthogonal component $q(t)$ of the base band signal outputted from the orthogonal detector 110 is converted into a digital signal at the A/D converter 130, at every sampling period T, providing a digital reception signal $q(nT)$, n being an integer.

The reception signals $p(nT)$ and $q(nT)$ outputted from the A/D converters 120 and 130, respectively, are inputted to the maximum likelihood sequence estimating equalizer 150. Then at the transmission line estimating section 151 provided inside the maximum likelihood sequence estimating equalizer 150, an in-phase component $g(nT)$ of the impulse response of the transmission line is calculated on the basis of the inputted reception signal $p(nT)$, and an orthogonal component $h(nT)$ of the impulse response of the transmission line is calculated on the basis of the inputted reception signal $q(nT)$.

After that, a replica $pR(nT)$ is calculated at the replica generator 152 on the basis of the in-phase component $g(nT)$ of the impulse response of the transmission line having been calculated by the transmission line estimating section 151. At the same time, a replica $qR(nT)$ is also calculated at the replica generator 152 on the basis of the orthogonal component $h(nT)$ of the impulse response of the transmission line having been calculated by the transmission line estimating section 151.

Then at the branch metric arithmetic section 153, a square of a difference between the reception signal $p(nT)$ outputted from the A/D converter 120 and the replica $pR(nT)$ calculated by the replica generator 152 is added together with a square of a difference between the reception signal $q(nT)$ outputted from the A/D converter 130 and the replica qR(nT) calculated by the replica generator 152, which resultant represents a branch metric.

Next, the signal sequence estimating section 154 uses the well-known Viterbi algorithm (cf. "WAVEFORM EQUALIZATION TECHNOLOGY FOR DIGITAL MOBILE COMMUNICATION" by Horikoshi et al., pp. 85–89, Triceps Publication) to estimate the transmitted signal sequence on the basis of the branch metric having been calculated by the branch metric arithmetic section 153.

In such receiving device as discussed above, there are some probable estimation errors in the signal sequence estimation by the equalizer, due to a phase difference between the in-phase component (to be referred to as Ich) and the orthogonal component (to be referred to as Qch), and due to an amplitude difference, DC offset and so forth, caused by the provision of two systems to cope with Ich and Qch respectively, as the orthogonal detector 110, the filters 113 and 114, and the A/D converters 120 and 130 are provided. As such estimation error occurs, the transmission characteristic is to deteriorate considerably. Therefore, in this conventional example, the receiving device requires a high-precision phase adjustment, gain adjustment, etc. in order to obtain a suitable transmission characteristic.

FIG. 2 is a diagram showing a receiving device as disclosed in Japanese Patent Laid-Open Publication No. 1-300611. This receiving device was designed to exclude any adjustment for eliminating the phase and amplitude differences between Ich and Qch in the receiving device shown in FIG. 1 as well as eliminating any DC offset.

As shown in FIG. 2, in this conventional example, the device comprises an oscillator 220 generating and outputting a signal cos 2Π(f0−B)t, a mixer 210 combining a center frequency f0 with a received input signal x(t) having a bandwidth B and the signal cos 2Π(f0−B)t having been outputted from the oscillator 220, a band pass filter 230, a sampling circuit 240 and an A/D converter 250 converting a signal with a bandwidth of B/2<f<3B/2 having been outputted from the mixer 210 and passed through the band pass filter 230 into a digital signal xn, a digital filter 260, a sampling circuit 270 sample-thinning the signal having been converted into a digital signal at the sampling circuit 240 and the A/D converter 250 and passed through the digital filter 260, so as to output a signal ip corresponding to Ich, and a sampling circuit 280 sample-thinning the signal having been converted into a digital signal by the sampling circuit 240 and the A/D converter 250 and passed through the digital filter 260, so as to output a signal qp corresponding to Qch.

Such receiving device as described above is improved as compared to preceding conventional devices, for the typical structure with two sets of mixers, filters and A/D converters provided for Ich and Qch, respectively, is changed to a structure with a single set of mixer, filter and A/D converter. In this way, there would be no phase difference nor amplitude difference between Ich and Qch, and as to the DC component, it is to be eliminated by the digital filter 260.

The digital filter 260 is composed of $(1-Z^{-2})$ filters 261, 262, $H_1$ filter 263, and $H_2$ filter 264. The digital filter 260 has a function of correcting the time lag between the in-phase component and the orthogonal component of the base band signal. As a result, time lags in the signals ip and qp are corrected.

In other words, the output signals ip and qp from the receiving device shown in FIG. 2 correspond to the in-phase component p(t) and the orthogonal component q(t) shown in FIG. 1, respectively. Therefore, a combination of the receiving device shown in FIG. 2 and the maximum likelihood sequence equalizer 150 shown in FIG. 1 would provide the orthogonal detecting function and the equalizing function corresponding to those shown in FIG. 1, which materializes a receiving device requiring no adjustments for eliminating any phase difference, amplitude difference and DC offset.

In the receiving device shown in FIG. 2, some of the advantages would be that the device can become adjustment-free, and can exhibit high-quality performance. Furthermore, since analog circuits such as a mixer, a filter and an A/D converter can come in a single set, the device can be miniaturized and become highly integrated.

In this receiving device, however, a digital filter as an additional circuit has to be added in order to correct any time lag between the in-phase component and the orthogonal component of the base band signal, which makes it more difficult to attempt further miniaturization or integration of the device.

SUMMARY OF THE INVENTION

It is therefore an object of the present invention to solve the above-described problems exhibited by the conventional cases, and to provide a receiving device with a high equalizing ability, which is capable of eliminating any phase difference or amplitude difference between Ich and Qch, and any DC offset, without applying any large-scale additional circuit, while such phase and amplitude differences and DC offset can be a cause to a deterioration in the transmission characteristic of the device.

In order to achieve the above objective, the receiving device of the present invention comprises: an oscillator generating a frequency different from a carrier frequency by $(2n+\frac{1}{2})\omega 0$, provided that n is an integer, $\omega 0=2\Pi/T$, and T is a transmission rate of a base band signal; a mixer combining a reception signal and the signal having the frequency generated by said oscillator; a filter for filtering the signal synthesized by said mixer; an A/D converter sampling the signal passed through said filter at every T/2 so as to convert the signal into a digital signal for output; a polarity signal generator generating a polarity signal of which polarity inverts at every sample; a multiplier multiplying the signal having been outputted from said A/D converter and the polarity signal having been generated by said polarity signal generator, the resultant signal destined for output; a selector dividing up the output signal from said multiplier between a signal at time nT and a signal at time $(n+\frac{1}{2})T$, which are destined for output; and a maximum likelihood sequence estimating equalizer using maximum likelihood sequence estimation for estimating a transmission signal sequence on the basis of the output signal from said selector, said maximum likelihood sequence estimating equalizer having a transmission line estimating section calculating an impulse response of the transmission line on the basis of the output signal from said selector, a replica generator calculating a replica on the basis of the impulse response of the transmission line having been calculated by said transmission line estimation section, a branch metric arithmetic section for calculating a branch metric indicating a difference between the output signal from said selector and the replica having been calculated by said replica generator, and a signal sequence estimating section using maximum likelihood sequence estimation in order to estimate the transmission signal sequence.

In accordance with the receiving device of the present invention, the filter passes through a signal component of a center frequency $(2n+\frac{1}{2})\omega 0$ in the resultant signal from said mixer, and eliminates a DC component.

In accordance with the receiving device of the present invention, the maximum likelihood sequence estimating equalizer regards the sum of a square of a difference between the input signal at time nT and the replica at time nT and a square of a difference between the input signal at time $(n+½)T$ and the replica at time $(n+½)T$, as a branch metric, which is used for maximum likelihood sequence estimation.

In the receiving device of the present invention having the above structure, the DC component of the reception signal is eliminated by the filter after the reception signal is being frequency-converted, simple logical circuits such as the multiplier, polarity signal generator, selector, etc. are added, and the process timing at the equalizer is changed. Therefore, no correction on the time lag between the in-phase component and the orthogonal component of the base band signal would be required, meaning that no such digital filter having been required in the conventional cases would be necessary.

BRIEF DESCRIPTION OF THE DRAWINGS

The above and further objects and the novel feature of the invention will more fully appear from the following detailed description when the same is read in connection with the accompanying drawings, in which:

FIG. 3 is a diagram showing one embodiment of a receiving device of the present invention.

DESCRIPTION OF THE PREFERRED EMBODIMENTS

Figure 1:
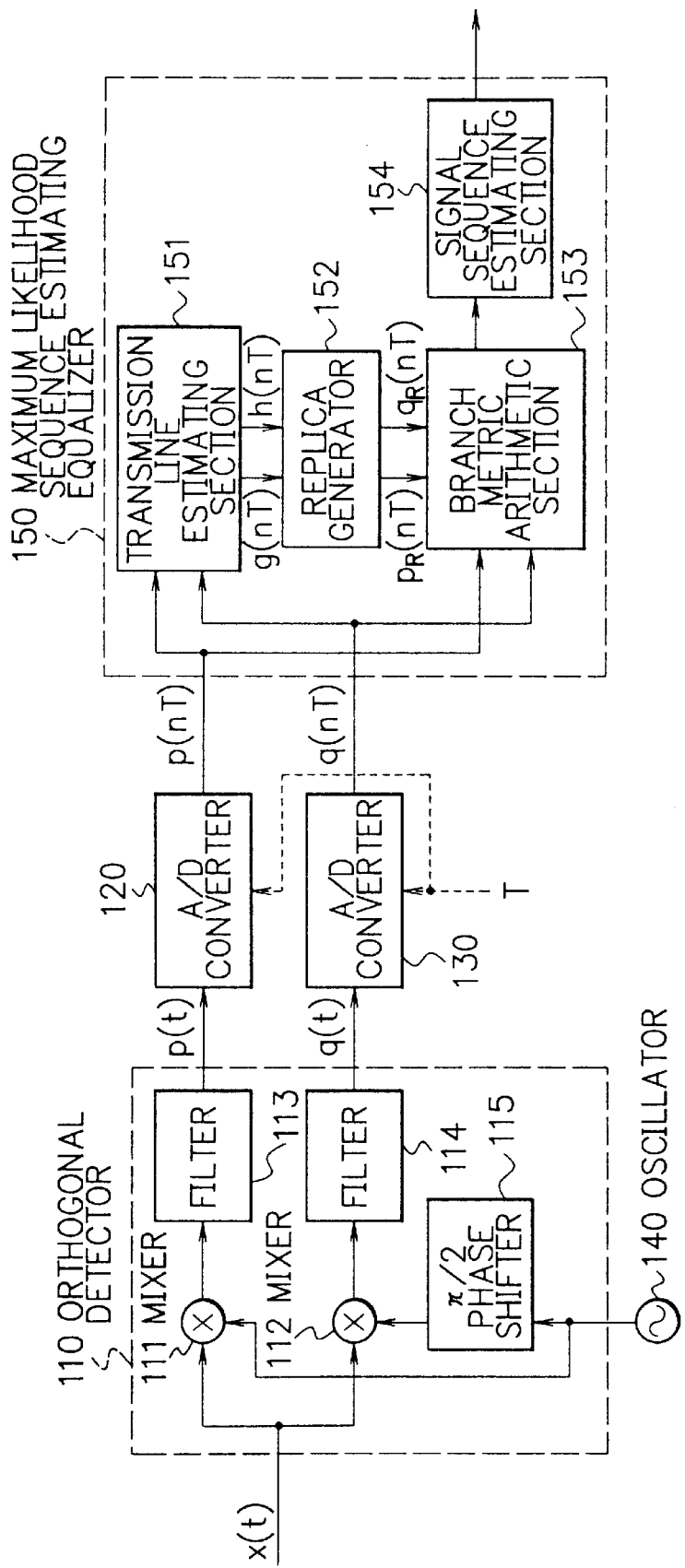
FIG. 1 is a block diagram showing one example of structure of a conventional receiving device.
Figure 2:
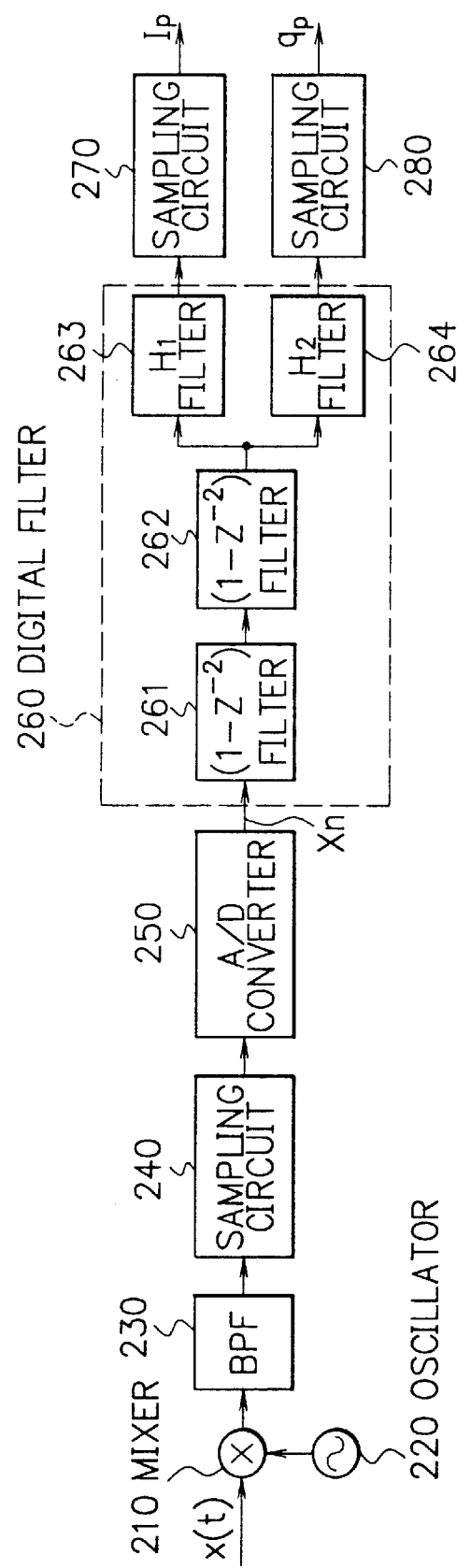
FIG. 2 is a diagram showing structure of a receiving device as disclosed in Japanese Patent Laid-Open Publication No. 1-300611.

Referring now to the drawings, a description of a preferred embodiment of the present invention will be given in detail.

FIG. 3 is a diagram illustrating one embodiment of a receiving device of the present invention.

As shown in FIG. 3, the receiving device comprises an oscillator 20, a mixer 10, a band pass filter 30, an A/D converter 40, a polarity signal generator 60, a multiplier 50, a selector 70, and a maximum likelihood sequence estimating equalizer 80.

The oscillator 20 serves to generate a signal $\cos\{\omega c+(2n+½)\omega 0\}t$, where $\omega c$ represents an angular frequency of a carrier wave, $\omega 0$ represents $2\Pi/T$, T represents a transmission rate of a base band signal, and n is an integer. The mixer 10 is to receive a reception signal $x(t)=p(t) \cos \omega ct - q(t) \sin \omega ct$, and the output signal $\cos\{\omega c+(2n+½)\omega 0\}t$ from the oscillator 20, which are combined to let the reception signal be frequency-converted for output. When receiving the output signal from the mixer 10, the band pass filter 30 lets through only a low-frequency component (i.e. a signal component of a center frequency $(2n+½)\omega 0$), which is outputted as a signal $y(t)=p(t) \cos(2n+½)\omega 0t + q(t) \sin(2n+½)\omega 0t$. The output signal $y(t)=p(t) \cos(2n+½)\omega 0t + q(t) \sin(2n+½)\omega 0t$ from the band pass filter 30 is sampled at a cycle of T/2, so as to be converted into a digital signal and outputted as YN. The polarity signal generator 60 is to generate a polarity signal of which polarity is inverted by every two samples. The multiplier 50 is to multiply the output signal YN from the A/D converter 40 and the polarity signal outputted from the polarity signal generator 60. The selector 70 is to divide up the resultant signal from the multiplier 50 at every T/2, so as to output an in-phase component $p(nT)$ of the reception signal at time nT, and an orthogonal component $q[(n+½)T]$ of the reception signal at time $(n+½)T$. The maximum likelihood sequence estimating equalizer 80 is to output an estimating signal on the basis of the output from the selector 70, i.e. the in-phase component $p(nT)$ of the reception signal at time nT, and the orthogonal component $q[(n+½)T]$ of the reception signal at time $(n+½)T$.

The maximum likelihood sequence estimating equalizer 80 comprises a transmission line estimating section 81, a replica generator 82, a branch metric arithmetic section 83, and a signal sequence estimating section 84. The transmission line estimating section 81 is to calculate an in-phase component $g(nT)$ of the transmission line impulse response on the basis of the output from the selector 70 i.e. the in-phase component $p(nT)$ of the reception signal at time nT, and an orthogonal component $h[(n+½)T]$ of the transmission line impulse response on the basis of the output from the selector 70, i.e. the orthogonal component $q[(n+½)T]$. The replica generator 82 is to calculate an in-phase component $pR(nT)$ of the replica signal on the basis of the in-phase component $g(nT)$ of the transmission line impulse response having been calculated at the transmission line estimating section 81. At the same time, the replica generator 82 is to calculate an orthogonal component $qR[(n+½)T]$ of the replica signal on the basis of the orthogonal component $h[(n+½)T]$ of the transmission line impulse response having been calculated at the transmission line estimating section 81. On the basis of the in-phase component $p(nT)$ of the reception signal at time nT having been outputted from the selector 70, and the in-phase component $pR(nT)$ of the replica signal having been calculated at the replica generator 82, the branch metric arithmetic section 83 is to calculate a branch metric indicating the difference between the in-phase component $p(nT)$ of the reception signal at time nT as well as the orthogonal component $q[(n+½)T]$ of the reception signal at time $(n+½)T$, having been outputted from the selector 70, and the in-phase component $pR(nT)$ as well as the orthogonal component $qR[(n+½)T]$ of the replica signal, having been calculated at the replica generator 82. On the basis of the branch metric calculated at the branch metric arithmetic section 83, the signal sequence estimating section 84 is to estimate the transmitted signal sequence.

In the band pass filter 30, the larger the value of n is, the further away the signal pass band becomes from the DC component, as it also enables the function of eliminating the DC offset.

In the following, operation of the receiving device as constituted above will be described.

When the reception signal $x(t)=p(t) \cos \omega ct - q(t) \sin \omega ct$ is inputted, the mixer 10 is to combine the reception signal with the signal $\cos\{\omega c+(2n+½)\omega 0\}t$, by which the reception signal is frequency-converted. Then due to having only the low-frequency component, i.e. a signal component of a center frequency $(2n+½)\omega 0$ in the resultant signal from the mixer 10 pass through the band pass filter 30, the signal $y(t)=p(t) \cos(2n+½)\omega 0t + q(t) \sin(2n+½)\omega 0t$ can be obtained.

In the A/D converter 40, the signal $y(t)=p(t) \cos(2n+½)\omega 0t+q(t) \sin(2n+½)\omega 0t$ having been outputted from the band pass filter 30 is sampled at a cycle of T/2 so as to be converted into a digital signal and outputted as YN.

Considering the sampling time at the A/D converter 40 as t=(2k+m/2)T, where k is an integer, and m=0,1,2,3, y(t) can be represented by the following expressions.

$$y[(2k+m/2)T]=p[(2k+m/2)T]\cos(m\Pi/2)+q[(2k+m/2)T]\sin(m\Pi/2)$$
$$y[2kT]=p[2kT](m=0)$$

$$y[(2k+\tfrac{1}{2})T]=q[(2k+\tfrac{1}{2})T](m=1)$$

$$y[(2k+1)T]=-p[(2k+1)T](m=2)$$

$$y[(2k+\tfrac{3}{2})T]=-q[(2k+\tfrac{3}{2})T](m=3)$$

Thus the expression for YN would be YN= ..., p(2kT), q[(2k+½)T], -p[(2k+1)T], -q[(2k+3/2)T], ...

Then the signal YN outputted from the A/D converter 40 and the polarity signal outputted from the polarity signal generator 60 are multiplied at the multiplier 50. In this event, since the polarity signal is outputted as the polarity is inverted by every two samples such as +1, +1, -1, -1, the multiplier 50 is to output a signal Y'N= ..., p(nT), q[(n+½)T], ...

Then at the selector 70, the signal Y'N being multiplied by the signal outputted from the multiplier 50 is divided up at every T/2, so that the in-phase component p(nT) of the reception signal at time nT, and the orthogonal component q[(n+½)T] of the reception signal at time (n+½)T are outputted.

The in-phase component p(nT) of the reception signal at time nT and the orthogonal component q[(n+½)T] of the reception signal at time (n+½)T are inputted to the maximum likelihood sequence estimating equalizer 80, where they are given to the transmission line estimating section 81. In the transmission line estimating section 81, the in-phase component g(nT) of the transmission line impulse response is calculated on the basis of the in-phase component p(nT) of the reception signal at the input time nT, and the orthogonal component h[(n+½)T] of the transmission line impulse response is calculated on the basis of the orthogonal component q[(n+½)T] at the input time (n+½)T.

Next, at the replica generator 82, the in-phase component pR (nT) of the replica signal is calculated on the basis of the in-phase component g(nT) of the transmission line impulse response having been calculated at the transmission line estimating section 81. Furthermore, at the replica generator 82, the orthogonal component qR[(n+½)T] of the replica signal is calculated on the basis of the orthogonal component h[(n+½)T] of the transmission line impulse response having been calculated at the transmission line estimating section 81.

Then at the branch metric arithmetic section 83, a square of the difference between the in-phase component p(nT) of the reception signal at time nT having been outputted from the selector 70 and the in-phase component pR(nT) of the replica signal having been calculated by the replica generator 82 is added together with a square of the difference between the orthogonal component q[(n+½)T] of the reception signal at time (n+½)T having been outputted from the selector 70 and the orthogonal component qR[(n+½)T] of the replica signal having been calculated at the replica generator 82, the sum being represented by the following expression.

$$r^2=|p(nT)-pR(nT)|^2+|q[(n+\tfrac{1}{2})T]-qR[(n+\tfrac{1}{2})T]|^2$$

Then $r^2$ having been calculated at the branch metric arithmetic section 83 is inputted to the signal sequence estimating section 84 as a branch metric, according to which the transmitted signal sequence is estimated by the maximum likelihood sequence estimation as in the conventional case.

As discussed above, according to the present invention, the device configuration takes only a single set of a mixer, a filter and an A/D converter, where no phase difference or amplitude difference are generated between Ich and Qch to cause any deterioration in the transmission characteristic. Furthermore, the present invention does not require any large-scale additional circuit in order to correct any time lag between Ich and Qch or to eliminate any DC offset, which proves its high equalizing ability.

Therefore, the receiving device of the present invention has improved performance and is suitable for miniaturization.

While the preferred embodiment of the invention has been described using specific terms, such description is for illustrative purposes only, and it is to be understood that changes and variations may be made without departing from the spirit or the scope of the following claims.

What is claimed is:

1. A receiving device comprising:

an oscillator generating a frequency different from a carrier frequency by (2n+½)ω0, provided that n is an integer, ω0=2Π/T, and T is a transmission rate of a base band signal;

a mixer combining a reception signal and the signal having the frequency generated by said oscillator;

a filter for filtering the signal synthesized by said mixer;

an A/D converter sampling the signal passed through said filter at every T/2 so as to convert the signal into a digital signal for output;

a polarity signal generator generating a polarity signal of which polarity inverts at every sample;

a multiplier multiplying the signal having been outputted from said A/D converter and the polarity signal having been generated by said polarity signal generator, the resultant signal destined for output;

a selector dividing up the output signal from said multiplier between a signal at time nT and a signal at time (n+½)T, which are destined for output; and a maximum likelihood sequence estimating equalizer using maximum likelihood sequence estimation for estimating a transmission signal sequence on the basis of the output signal from said selector, said maximum likelihood sequence estimating equalizer having a transmission line estimating section calculating an impulse response of the transmission line on the basis of the output signal from said selector, a replica generator calculating a replica on the basis of the impulse response of the transmission line having been calculated by said transmission line estimation section, a branch metric arithmetic section for calculating a branch metric indicating a difference between the output signal from said selector and the replica having been calculated by said replica generator, and a signal sequence estimating section using maximum likelihood sequence estimation in order to estimate the transmission signal sequence.

2. A receiving device as claimed in claim 1, wherein:
   said filter passes through a signal component of a center frequency (2n+½)ω0 in the resultant signal from said mixer, and eliminates a DC component.

3. A receiving device as claimed in claim 2, wherein:

said maximum likelihood sequence estimating equalizer regards the sum of a square of a difference between the input signal at time nT and the replica at time nT and a square of a difference between the input signal at time (n+½)T and the replica at time (n+½)T, as a branch metric, which is used for maximum likelihood sequence estimation.

* * * * *